(12) United States Patent
Hughes

(10) Patent No.: US 12,546,991 B2
(45) Date of Patent: Feb. 10, 2026

(54) IMAGING SYSTEM HAVING COIL ON MIRROR ACTUATOR

(71) Applicant: Luminar Technologies, Inc., Orlando, FL (US)

(72) Inventor: Sean P. Hughes, Casselberry, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 18/087,011

(22) Filed: Dec. 22, 2022

(65) Prior Publication Data

US 2023/0130390 A1 Apr. 27, 2023

Related U.S. Application Data

(63) Continuation of application No. 16/852,732, filed on Apr. 20, 2020, now Pat. No. 11,543,652.

(51) Int. Cl.
*G02B 26/10* (2006.01)
*G01S 7/481* (2006.01)
*G01S 17/89* (2020.01)

(52) U.S. Cl.
CPC ............ *G02B 26/105* (2013.01); *G01S 7/481* (2013.01); *G01S 7/4817* (2013.01); *G01S 17/89* (2013.01)

(58) Field of Classification Search
CPC .. G02B 26/101; G02B 7/1821; G02B 26/085; G01S 7/4817; G01S 17/42
See application file for complete search history.

(56) References Cited

U.S. PATENT DOCUMENTS

| | | | |
|---|---|---|---|
| 6,008,924 A | 12/1999 | Ikegame | |
| 6,038,088 A | 3/2000 | Ikegame | |
| 6,108,118 A | 8/2000 | Minamoto | |
| 7,092,135 B2 | 8/2006 | Benner, Jr. et al. | |
| 8,072,663 B2 | 12/2011 | O'Neill et al. | |
| 9,063,549 B1 | 6/2015 | Pennecot et al. | |
| 9,425,664 B2 | 8/2016 | Wedman et al. | |
| 10,852,431 B1 * | 12/2020 | Duan | G01S 7/484 |
| 11,794,666 B2 * | 10/2023 | Huelsen | B62D 25/06 |
| 2010/0118363 A1 | 5/2010 | Shigematsu et al. | |
| 2012/0193428 A1 | 8/2012 | Bu | |
| 2018/0284286 A1 | 10/2018 | Eichenholz et al. | |

FOREIGN PATENT DOCUMENTS

| | | | |
|---|---|---|---|
| CN | 102081228 | 6/2011 | |
| DE | 60204303 T2 * | 5/2006 | ......... G02B 26/0816 |
| DE | 112013006119 | 3/2021 | |

(Continued)

OTHER PUBLICATIONS

Non-Final Office Action dated Jul. 12, 2022 for U.S. Appl. No. 16/852,732.

*Primary Examiner* — Christopher Stanford
(74) *Attorney, Agent, or Firm* — Van Pelt, Yi & James LLP

(57) ABSTRACT

A scanner for a lidar system is configured to direct emitted light to scan a field of regard of the lidar system in accordance with a scan pattern. The scanner includes a mirror and an actuator assembly. The mirror includes a reflective surface and a rear surface and is pivotable along a mirror axle. The actuator assembly is disposed along the rear surface of the mirror and is configured to exert a torque on the mirror to cause the mirror to pivot about the mirror axle.

25 Claims, 8 Drawing Sheets

(56) References Cited

FOREIGN PATENT DOCUMENTS

| | | | | |
|---|---|---|---|---|
| JP | H0694751 | A | * | 4/1994 |
| JP | 2007256474 | | | 10/2007 |
| JP | 2008046460 | | | 2/2008 |
| JP | 2010128116 | A | * | 6/2010 |
| JP | 2013190669 | | | 9/2013 |
| JP | 2014182167 | | | 9/2014 |

* cited by examiner

IMAGING SYSTEM HAVING COIL ON MIRROR ACTUATOR

CROSS REFERENCE TO RELATED APPLICATIONS

This application is a continuation of U.S. patent application Ser. No. 16/852,732, filed on Apr. 20, 2020, which is incorporated by reference herein in its entirety.

FIELD OF TECHNOLOGY

This disclosure relates generally to lidar sensor heads and, more specifically, to multi-mirror lidar sensor heads having a compact construction so as to occupy minimal area when deployed on a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An autonomous (or "self-driving") vehicle moving along a roadway with dedicated lanes may include a lidar system using a number of sensors and movable mirrors for scanning in different directions. For example, a single elevation mirror may be used for y-scanning purposes. Such mirrors are typically coupled with one or two motors positioned on ends of the mirror to apply the torque thereto to cause rotation. Such a system may be undesirable due to the motors occupying large amounts of space, thereby requiring a larger overall package, and additionally can have dynamic control problems due to the application of torque.

While the precision and efficacy of these systems have continually improved, the power requirements and physical dimensions of existing systems have posed obstacles to designers of such systems. With the increasing prevalence of the use of lidar systems in autonomous vehicles, such considerations are of increased concern to designers of these systems.

SUMMARY

In accordance with a first aspect, a scanner for a lidar system is configured to direct emitted light to scan a field of regard of the lidar system in accordance with a scan pattern. The scanner includes a mirror and an actuator assembly. The mirror includes a reflective surface and a rear surface and is pivotable along a mirror axle. The actuator assembly is disposed along the rear surface of the mirror and is configured to exert a torque on the mirror to cause the mirror to pivot about the mirror axle.

In some examples, the actuator assembly includes an inner assembly body, a coil assembly, and an outer assembly body. The inner assembly body includes a first surface and a second surface. The first surface is positioned adjacent to the rear surface of the mirror and extends along a length thereof. The coil assembly includes a first surface and a second surface. The first surface is positioned adjacent to the second surface of the inner assembly body. The outer assembly body has a first surface and a second surface. The first surface is positioned adjacent to the second surface of the coil assembly.

In some examples, the coil assembly includes a coil member encapsulated in a polymeric material. Further, in some examples, the coil assembly may include a coil member that forms a racetrack shape. In any of these forms, the coil assembly may further include a first edge and a second edge opposite the first edge. The rear surface of the mirror may include a first elongated slot to receive the first edge of the coil assembly and a second elongated slot to receive the second edge of the coil assembly.

In some examples, the coil assembly may include a printed circuit board (PCB) that includes a circuit trace that forms a racetrack shape. Further, in other examples, the coil assembly may include an electrically conductive material having a first coefficient of thermal expansion (CTE). The mirror may be constructed from a material having a second CTE. In some examples, the first CTE is approximately equal to the second CTE.

In some of these examples, the scanner may further include at least one magnet positioned adjacent to or near the second surface of the outer assembly body. The at least one magnet is configured to provide a magnetic field to the coil assembly. In some examples, the second surface of the inner assembly body may form a cavity to accommodate a coil cross over portion of the coil assembly. In some forms, the scanner may further include at least one mounting cap adapted to couple with and mount the scanner within the lidar system.

In some examples, the scanner may further include a rotatable polygon mirror and a polygon mirror axle. The rotatable polygon mirror includes a block having a first wall, a second wall, and a plurality of reflective surfaces extending between the first and second walls. The reflective surfaces are angularly offset from one another along a periphery of the block. The polygon mirror axle extends into the block through at least one of the first and second walls about which the block rotates. The polygon mirror axle is orthogonal to the mirror axle.

In accordance with a second aspect, a lidar system includes a light source (i.e., a laser) configured to emit light, a scanner configured to direct the emitted light to scan a field of regard (FOR) in accordance with a scan pattern, a receiver configured to detect at least a portion of emitted light scattered by one or more remote targets, and a controller configured to control motion of the mirror to scan the emitted light along the scan pattern. The scanner includes a mirror and an actuator assembly. The mirror has a reflective surface and a rear surface and is pivotable along a mirror axle. The actuator assembly is disposed along the rear surface of the mirror and is configured to exert a torque on the mirror to cause the mirror to pivot about the mirror axle. In some examples, the lidar system additionally includes both the mirror and a polygon mirror.

DETAILED DESCRIPTION

Figure 10:
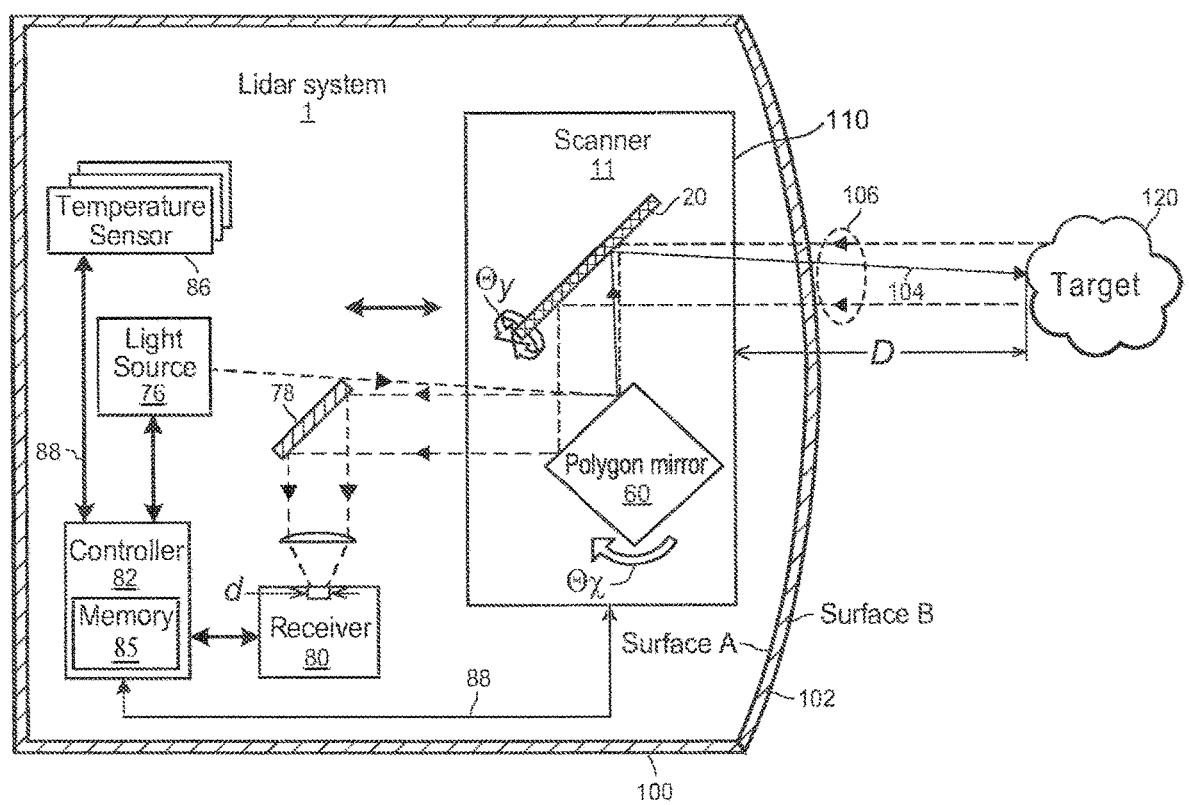
FIG. 10 is a block diagram of an example lidar system whereby the scanner of FIG. 1—operates in a single-eye configuration.
Figure 11:
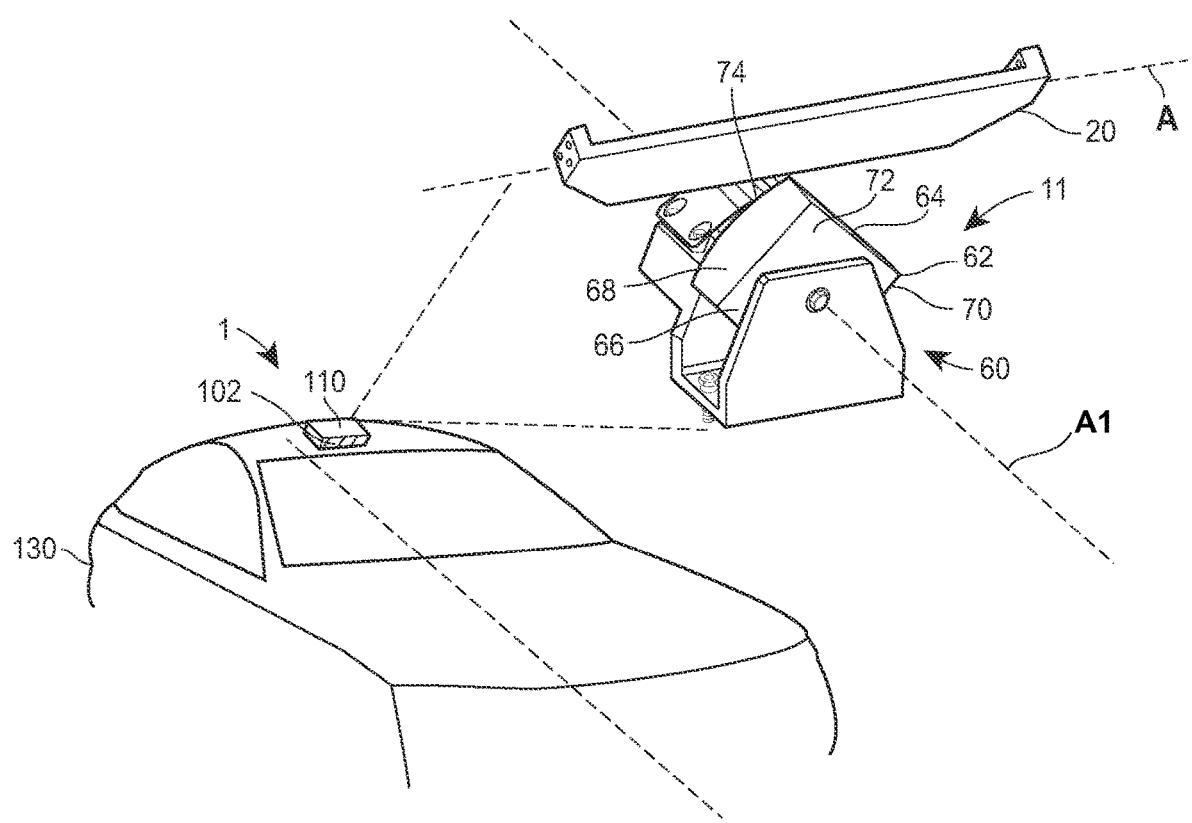
FIG. 11 is a perspective view of several components of the example lidar system being disposed on an example vehicle such that an axis of rotation of a mirror of the scanner aligns with an orientation of the vehicle in accordance with various embodiments.

Generally speaking, a lidar sensor unit and various techniques for operating the lidar sensor unit are discussed below, in particular: (i) an example assembly of a lidar sensor unit, and particularly a scanner of the lidar sensor unit as illustrated in FIGS. 1-9; (ii) example operation of the lidar sensor unit as part of a lidar system as illustrated in FIG. 10; and (iii) example placement of a lidar sensor unit on a body of a vehicle as illustrated as illustrated in FIG. 11.

The system of this disclosure efficiently disposes an actuator for controlling movement of the scanner directly behind the mirror to save space and to provide an integral unit. The actuator applies rotational torque evenly across the entire length of the mirror, so during rapid movements, the body of the mirror will not flex or twist. The system is highly efficient, thereby eliminating the need to use exotic materials for the mirror—aluminum or similar materials may be used.

The scanner of the lidar sensor unit is provided with a low profile when compared to conventional multi-mirror lidar systems. Certain structural and operational features of the lidar sensor units of the present disclosure may be employed, individually or collectively, to not only minimize the three-dimensional footprint or volume of space occupied by the lidar scanner, but also serve to improve aerodynamic performance (both internally and externally), reduce audible noise, reduce heat, and improve resistance to vibration, acceleration, deceleration, or other environmental factors that might otherwise negatively affect scanner accuracy and performance.

Turning now to the Figures, an example lidar sensor unit includes a scanner 11, a light source 76 configured to emit light, a receiver 80 and a controller 82. The scanner 11 is configured to direct emitted light to scan a field of regard of the lidar sensor unit in accordance with a scan pattern. Generally, the scanner 11 includes a first mirror 20 and an actuator assembly 30 disposed on or along the mirror 20.

More specifically, the first mirror 20 is in the form of a planar mirror that includes a reflective surface 21 and a rear surface 22 and is pivotable along a mirror axle A extending therethrough. The first mirror 20 includes a number of rotatable mounting members 24 positioned at opposing ends as well as any number of (e.g., two) coil mounting regions 26 in the form of slots positioned on the rear surface 22 thereof. The scanner 11 further includes endcaps 12 having any number of mounting members 13 to mount the scanner 11 within a housing 100 of the lidar sensor unit. Further, the endcaps 12 include a mirror mounting bore 14 dimensioned to accommodate the rotatable mounting members 24 of the mirror 20 to allow the mirror 20 to rotate relative to the endcaps 12. As previously noted, the mirror 20 may be constructed from any number of suitable materials such as, for example, aluminum.

The mirror 20 may be provided with an optimized geometry to enhance durability and service life. For instance, the mirror 20 may have a center of gravity closer to its reflective surface 21 than conventional planar mirrors of lidar sensor units. This may be effected by constructing a pivotable backing or support surface for the reflective surface 21 of the mirror 20 of a honeycomb structure or other ribbed structure, with material arranged such that the center of gravity of the mirror 20 is closer to the reflective surface 21 than to an edge of the ribbed or honeycomb structure opposite the reflective surface 21.

The actuator assembly 30 includes an inner assembly body 32, a coil assembly 40, and an outer assembly body 50. Generally, the actuator is located behind the mirror 20 to minimize space. Further, the actuator assembly 30 advantageously extends a portion of the length of the mirror 20. In some approaches, the actuator assembly 30 extends the entire length of the mirror 20. The actuator assembly 30 includes a combination of steel and magnetic components that are fixed in place and located adjacent to the coil assembly 40. The magnetic components provide a static magnetic field to the coil assembly 40. When an electrical current is provided to the coil assembly 40, the coil assembly 40 produces a magnetic field in response to the electrical current. The magnetic field produced by the coil assembly 40 interacts with the static magnetic field provided by the magnetic components, which in turn results in a rotational torque applied to the coil assembly 40. By applying a time-varying electrical current to the coil assembly 40, the mirror 20 can be made to move along a particular scan trajectory. So configured, the actuator assembly 30 applies a rotational torque evenly across the mirror 20, so even if the mirror 20 oscillates at a rapid frequency, the mirror 20 does not significantly flex, twist, or warp. In some of these examples, the actuator assembly 30 may be in the form of an aircore motor that provides a low inductance to allow for relatively large current pulses or rapid changes in current to be applied to the coil assembly, thus resulting in corresponding rapid changes in direction of the mirror 20.

The inner assembly body 32 has a first surface 33 and a second surface 34. The first surface 33 of the inner assembly body 32 is positioned adjacent to the rear surface 22 of the mirror 20 and extends along a length thereof. The inner assembly body 32 further includes any number of mounting members 35 in the form of holes (which may be threaded) positioned at ends thereof which, in the illustrated examples, are axially aligned with the mounting members 13 formed on the endcaps 12 to secure and/or couple the inner assembly body with the endcaps 12. As illustrated in the Figures, the inner assembly body 32 is semi- or partially-cylindrical in configuration, and includes a recessed region or cavity 36. Other examples are possible.

The coil assembly 40 has a first surface 41 and a second surface 42. The first surface 41 of the coil assembly 40 is positioned adjacent to or near the second surface 34 of the inner assembly body 30. In some examples, the coil assembly 40 is at least partially supported by the inner assembly body 30, meaning the coil assembly 40 has a similar semi- or partially-cylindrical curvature (e.g., a "saddle-shape") as the inner assembly body 30.

The coil assembly 40 includes a coil member 44 encapsulated or otherwise disposed within a shell material 45. In some examples, the shell material 45 is a polymeric material, though other examples of suitable shell materials are possible. In some examples, the coil assembly 40 is constructed via injection mold encapsulation, laminated preformed sheets, or by using metal stiffening members. Any other suitable approaches for disposing the coil member 44 within the shell material 45 are possible. As illustrated in the Figures, the coil member 44 forms a generally racetrack shape having first and second elongated portions 44a, 44b which, as will be described in greater detail below, advantageously cooperate to cause current to flow in opposite directions along the length of the coil assembly 40. The racetrack shape of the coil member 44 may have a shape that includes or is similar to an oval, ovoid shape, ellipse, rectangle, or rectangle with rounded corners. For example, the coil member 44 may include a length of wire that is wound or coiled into multiple loops having an overall racetrack shape. The wire may have an external layer of electrical insulation so that adjacent loops of the wire are not electrically shorted together.

Further, the coil assembly 40 (e.g., the shell material 45) includes mounting regions or members 46 in the form of elongated edges that are slidably inserted into the coil mounting regions 26. So configured, the coil assembly 40 is retained and coupled with the mirror 20 such that both the coil assembly 40 and the mirror 20 rotate about the mirror axle A. In some examples, the coil member 44 cross over may be advantageously disposed at the turns thereof such that the cross over is disposed within the recessed region or cavity 36 of the inner assembly body 32 to maintain a suitably large air gap. A coil cross over may refer to a portion of the coil member 44 that crosses over another portion of the coil member 44. For example, the coil member 44 may include a length of wire that is wound or coiled into multiple loops as an inward-directed spiral, and the cross over may refer to a last portion of the wire that crosses over the coiled wire to exit the coil member 44. In some implementations, a coil member 44 may include an even number of coiled portions (e.g., one portion of wire that is coiled as an inward-directed spiral and another portion of the wire coiled as an outward-directed spiral), and such a coil member 44 may not include any coil cross over.

Figure 12A:
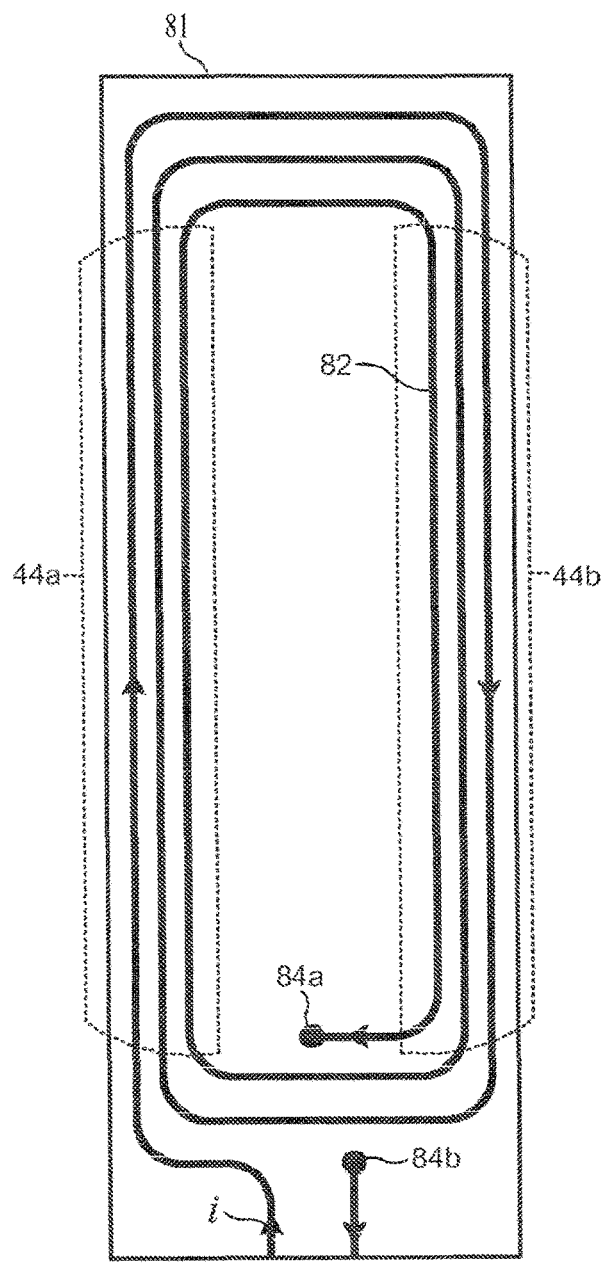
FIG. 12a is a top view of a first layer of an example printed circuit board (PCB) for use with the coil assembly of the scanner of FIGS. 1-11 in accordance with various embodiments.
Figure 12B:
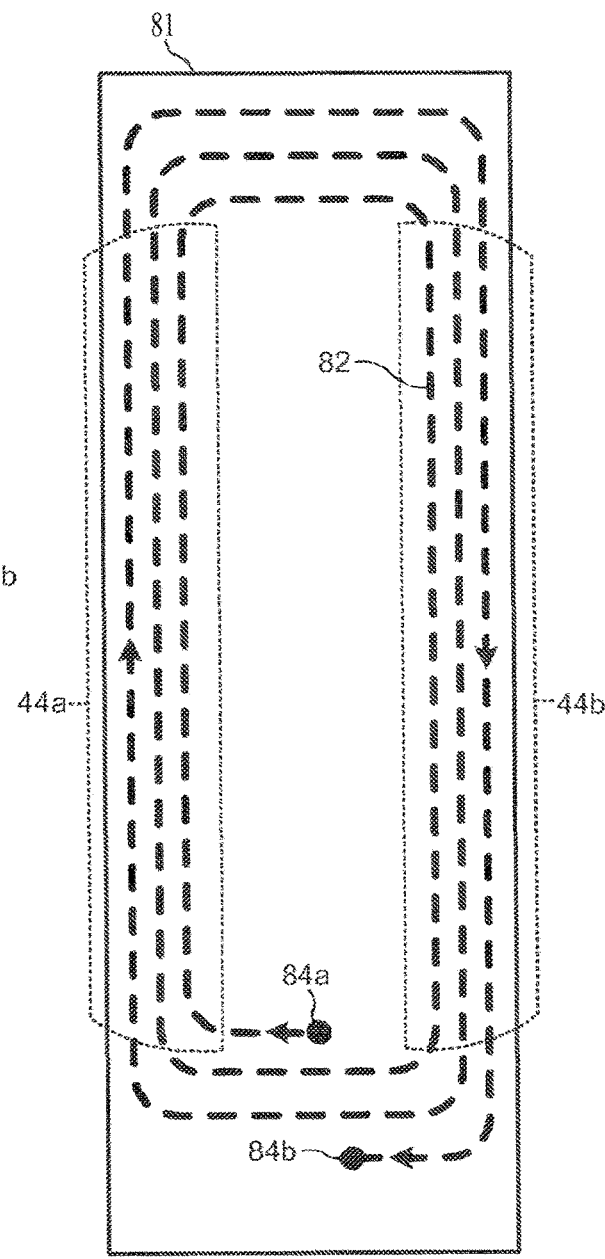
FIG. 12b is a top view of a second layer of the example PCB of FIG. 12a in accordance with various embodiments.

Turning to FIGS. 12a and 12b, two top views of an example printed circuit board 81 (PCB) with a circuit trace 82 are provided. In some implementations, a coil assembly 40 may include a PCB 81 with a circuit trace 82 that forms a racetrack shape instead of a coil member 44 that includes a coil of wire. As illustrated in FIGS. 12a and 12b, the circuit trace 82 has the shape of a rectangle with rounded corners. The circuit trace 82 may include any suitable electrically conductive material, such as for example, copper or aluminum. The circuit trace 82 may be attached to or encapsulated within the PCB material, which may include a ceramic or polymer material (e.g., a polymer material reinforced with glass fiber). The circuit trace 82 may be a continuous length of electrically conductive material arranged in a spiral-type configuration.

In some approaches, the circuit trace 82 may be disposed on multiple layers of the PCB. For example, the circuit trace 82 may be disposed on two layers of the PCB, where the circuit trace 82 is arranged in a racetrack shape that spirals inward on one layer and a similar racetrack shape that spirals outward on the other layer. As another example, the circuit trace 82 may be disposed on an even number of layers (e.g., 2, 4, 6, or 8 layers), where the circuit trace 82 spirals inward on half of the layers and spirals outward on the other half of the layers. The example PCB 81 in FIGS. 12a and 12b has two layers, with FIG. 12a illustrating the upper layer with the circuit trace 82 arranged to spiral inward and FIG. 12b illustrating the lower layer with the circuit trace 82 (illustrated as a dashed line) spiraling outward. The upper and lower portions of the circuit trace 82 are connected by via 84a and via 84b. The direction of the current flow i along the circuit trace 82 is represented by the arrows in FIGS. 12a and 12b. For both the upper and lower layers, the current i runs in one direction along the elongated portion 44a and in the opposite direction along the elongated portion 44b.

In some implementations, a coil assembly may include a coil member with a coefficient of thermal expansion (CTE) that is approximately equal to the CTE of the mirror 20. For example, the coil member may include an electrically conductive material (e.g., wire made from copper or aluminum), and the mirror 20 may be made from the same material or a material having approximately the same CTE. As another example, the coil assembly may include a PCB 81 that is attached (e.g., using epoxy or mechanical fasteners) to the back surface of the mirror 20. The circuit trace 82 may include an electrically conductive material (e.g., copper or aluminum) that has approximately the same CTE as the mirror 20. The CTE of the coil member and the CTE of the mirror 20 being approximately equal may refer to the two CTEs being within approximately 1%, 2%, 5%, or 10% of each other. If two materials with dissimilar CTEs are used for the coil member and mirror, then as the environmental temperature changes, the different expansion of the coil member with respect to the mirror may cause the reflective surface of the mirror to flex, bend, or warp. A warped mirror may cause unwanted beam deflection or distortion. By using materials with approximately the same CTE, the reflective surface of the mirror 20 may exhibit little or no warping as the environmental temperature changes.

Figure 1:
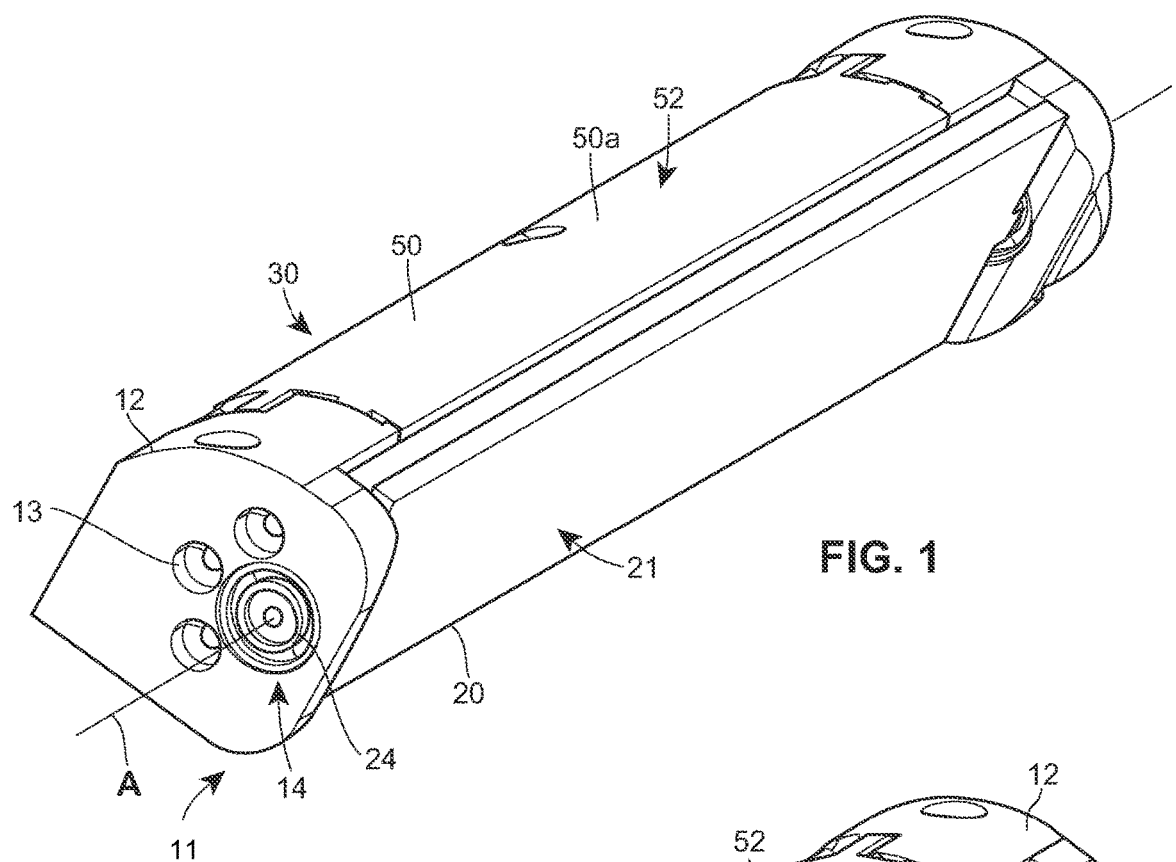
FIG. 1 is a front perspective view of an example scanner for a lidar system of the present disclosure.
Figure 2:
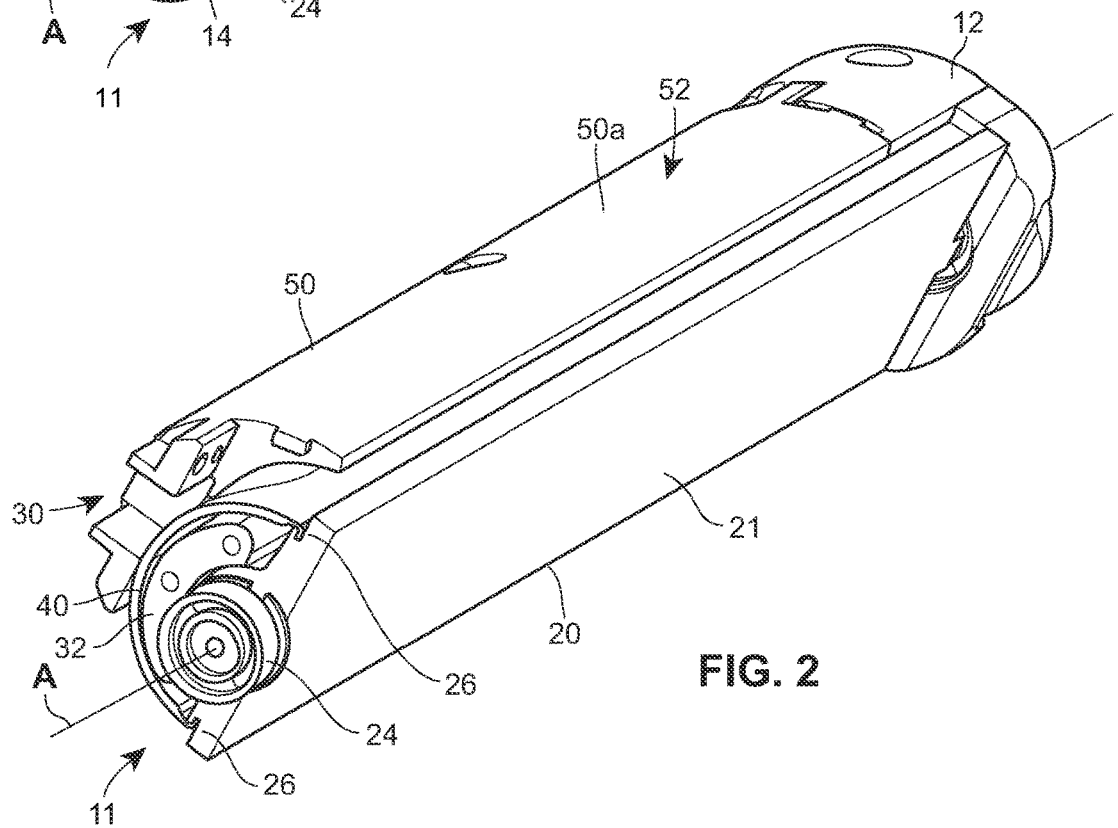
FIG. 2 is a front perspective view of the example scanner of FIG. 1, with a portion of an example housing removed for clarity in accordance with various embodiments.
Figure 3:
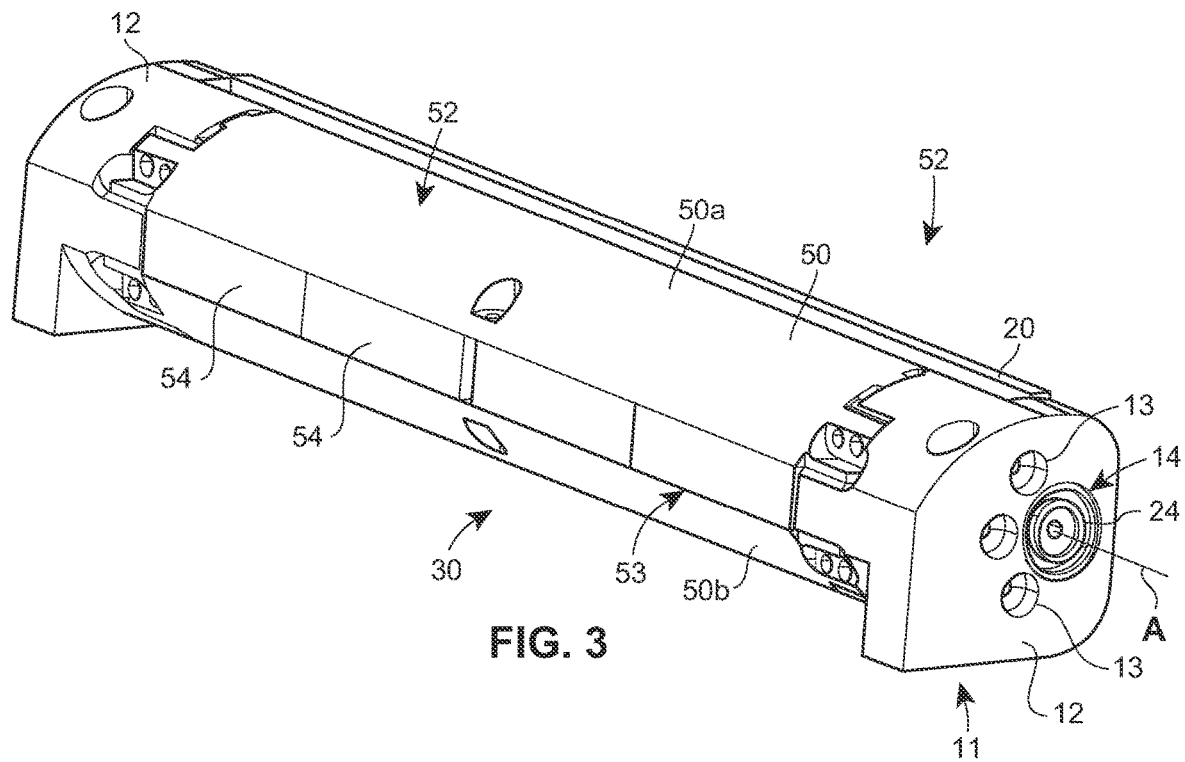
FIG. 3 is a rear perspective view of the example scanner of FIGS. 1 and 2 in accordance with various embodiments.
Figure 4:
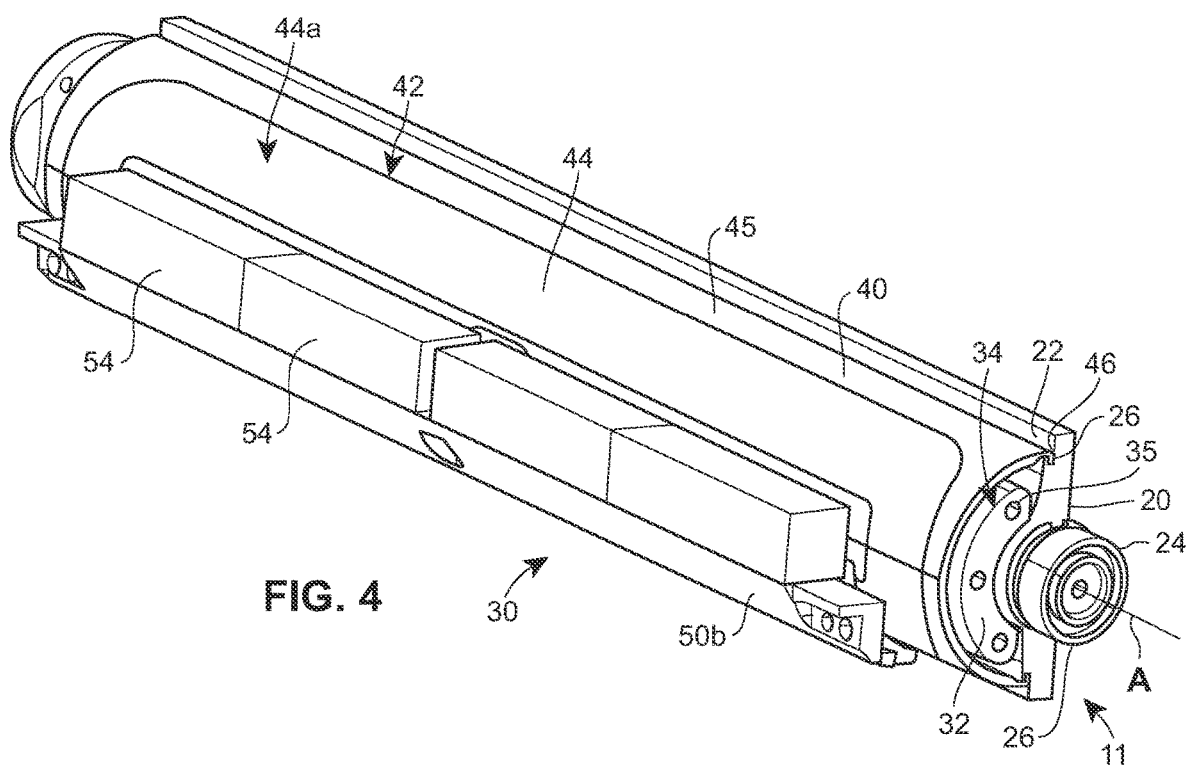
FIG. 4 is a rear perspective view of the example scanner of FIGS. 1-3, with a portion of the example housing removed for clarity in accordance with various embodiments.
Figure 5:
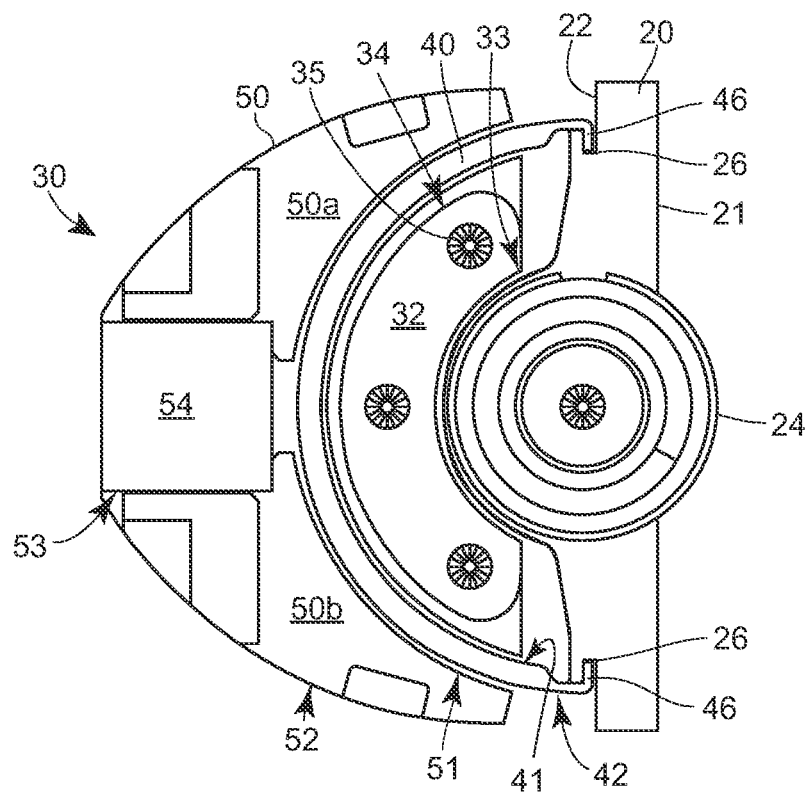
FIG. 5 is a right side elevation view of the example scanner of FIGS. 1-4, with a portion of the example housing removed for clarity in accordance with various embodiments.
Figure 6:
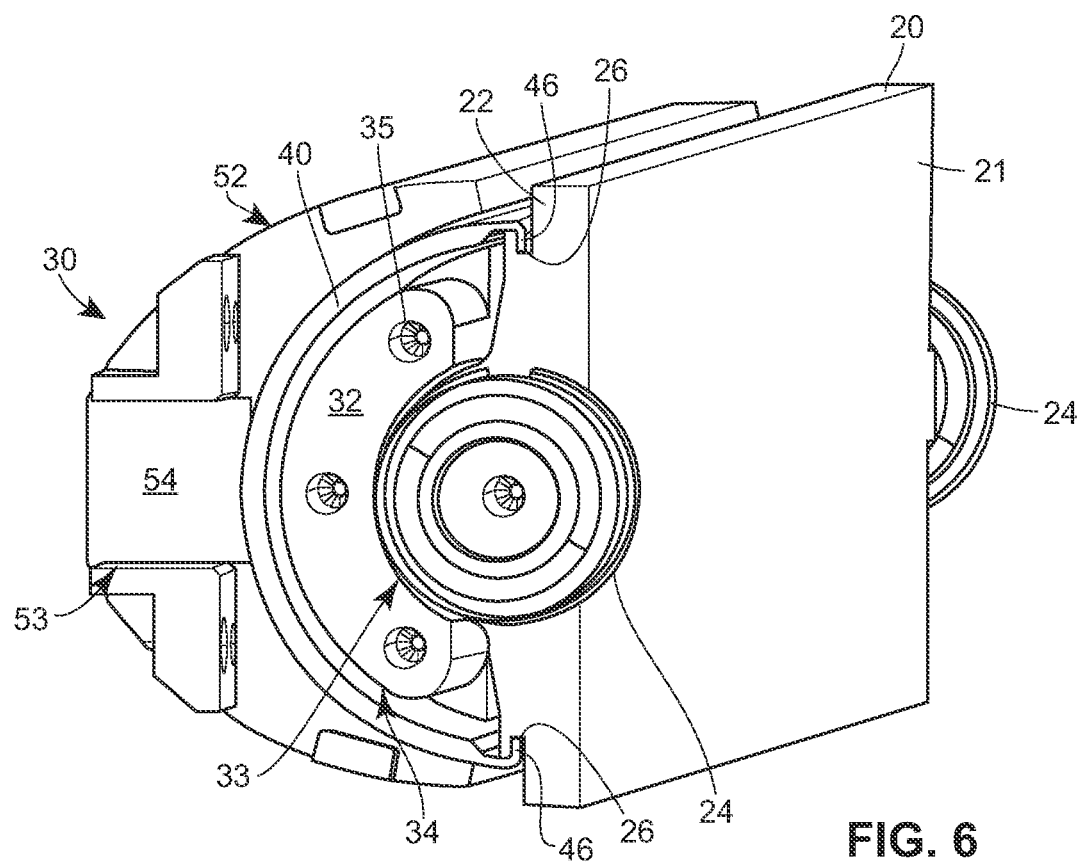
FIG. 6 is a close up front perspective view of the example scanner of FIGS. 1-5, with a portion of the example housing removed for clarity in accordance with various embodiments.
Figure 7:
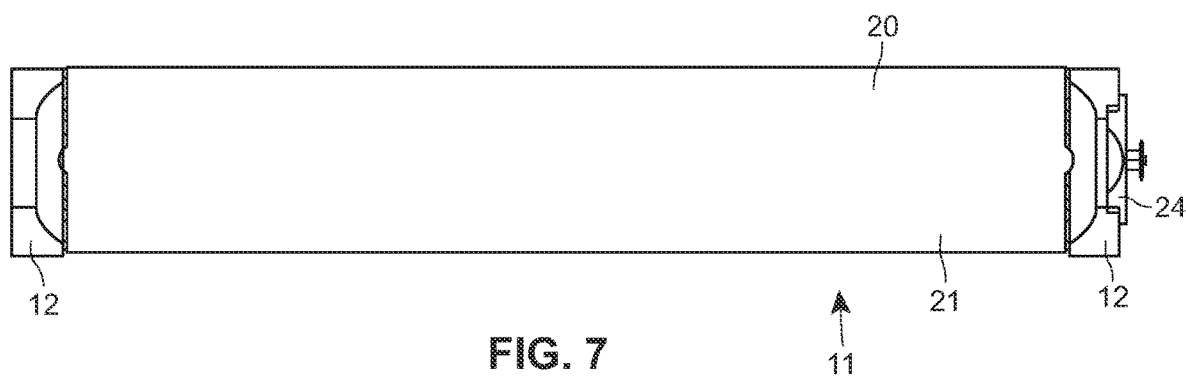
FIG. 7 is a front elevation view of the example scanner of FIGS. 1-6 in accordance with various embodiments.
Figure 8:
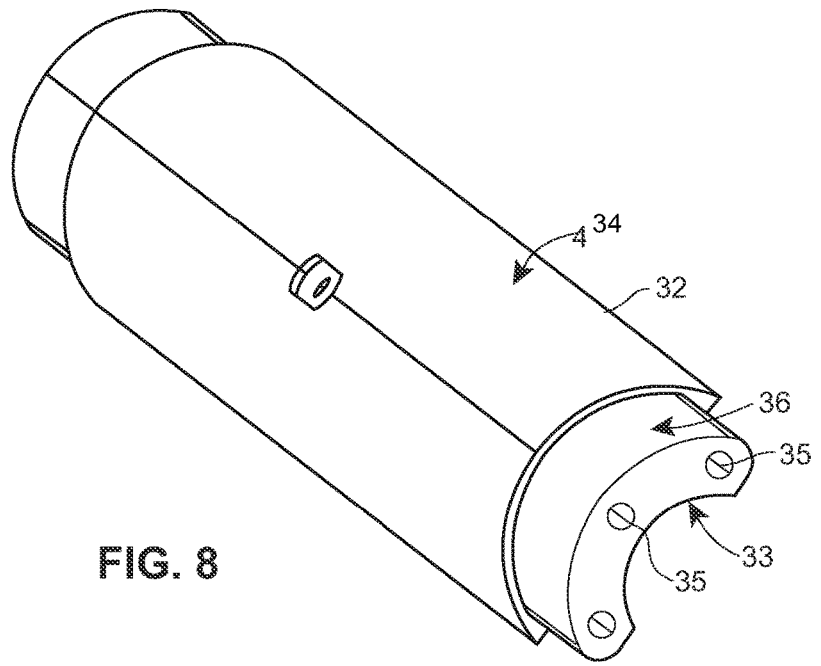
FIG. 8 is a rear perspective view of an example inner housing body of the example scanner of FIGS. 1-7 in accordance with various embodiments.
Figure 9:
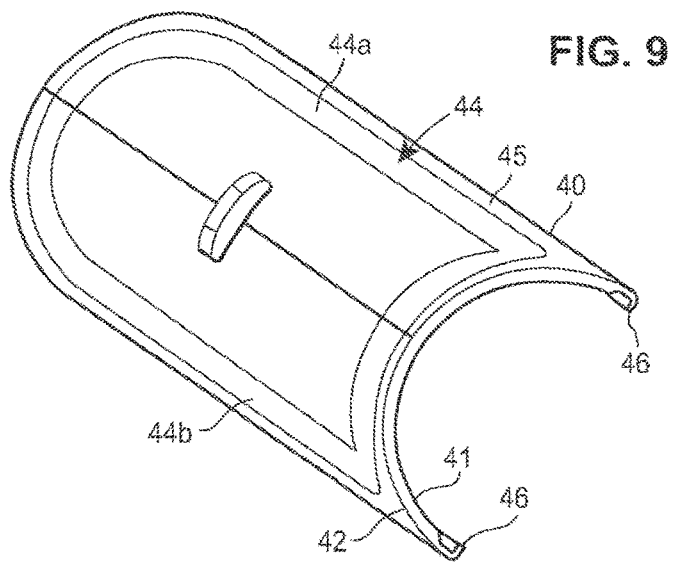
FIG. 9 is a rear perspective view of an example coil assembly of the example scanner of FIGS. 1-8 in accordance with various embodiments.

The outer assembly body 50 has a first surface 51 and a second surface 52. The first surface 51 of the outer assembly body 50 is positioned adjacent to the second surface 42 of the coil assembly 40. In the illustrated example, the outer assembly body 50 is in the form of a first section 50a and a second section 50b which cooperate to define a gap 53 that accommodates a magnet or magnets 54. As illustrated in FIG. 4, the magnet or magnets 54 are positioned such that they are generally disposed adjacent to an interior region of the coil member 44. Put differently, the magnet or magnets 54 are disposed in the gap formed between the first and second elongated portions 44a, 44b. Accordingly, the racetrack shape of the coil member 44 causes current to flow in opposite directions in the first and second elongated portions 44a, 44b, resulting in a highly efficient design that causes the mirror 20 to pivot about the mirror axle A. In these examples, the outer assembly body 50 may remain fixed relative to the coil assembly 40 and the mirror 20, and may be mounted directly to the endcaps 12 via any number of suitable approaches.

It is appreciated that any number of suitable approaches for providing electrical contacts to the actuator assembly 30 as well as relative mounting locations are envisioned. The frequency of the electrical current provided to the coil assembly 40 of the actuator assembly 30 will define a frequency of oscillation of the mirror 20, which in turn controls the scan rate of the scanner 11. The selection of the location of suitable electrodes may be driven by space and mounting considerations of the scanner 11.

The scanner 11 may additionally include a second mirror 60 in the form of a rotatable polygon mirror which may have a first wall, a second wall, and a number of reflective surfaces extending between the first and second walls. These reflective surfaces are angularly offset from one another along a periphery of the block. The polygon mirror axle extends into the block through at least one of the first or the second walls about which the block rotates and is orthogonal to the mirror axle A. The orientation of the scanner 11, and specifically, the orientation of the axis of rotation of the polygon mirror 60, may be selected so as to align with an orientation of a vehicle in which the lidar sensor unit operates. In some implementations, however, a lidar sensor unit operating in a vehicle includes multiple lidar sensor units, with at least some of the lidar sensor units oriented differently from each other.

The second mirror 60 cooperates with the first mirror 20 to perform a scan of a field of regard (FOR) of the lidar sensor unit. The first, pivotable planar mirror 20 may be referred to herein as a Y-scan mirror, but it is understood that depending on the orientation of the first and second mirrors 20, 60, the scanning range achieved by the first mirror 20 may be in any of the X- Y- or Z-planes. The rotatable polygon mirror 60 includes a block 62 having a plurality of (preferably at least four) finished reflective surfaces 64, 66, 68, 70. It is possible, however, to use a triangle-shaped rotatable polygon mirror with three reflective surfaces. In another implementation, not every surface of the rotatable polygon mirror 60 oriented toward the planar mirror 20 is reflective (e.g., the rotatable polygon mirror 60 can be a flat substrate with reflective surfaces on the front and back sides). More generally, the rotatable polygon mirror 60 may have any suitable number of reflective surfaces, such as for example any number between two and eight reflective surfaces. The polygon mirror 60 may be made from any suitable material, such as for example, glass, plastic (e.g., polycarbonate), metal (e.g., aluminum or beryllium), metal foam, carbon fiber, ceramic, or any suitable combination thereof.

The rotatable polygon mirror 60 further includes a first wall 72 and a second wall 74. Each of the plurality of reflective surfaces 64, 66, 68, 70 extends between the first and second walls 72, 74. The reflective surfaces 64-70 are angularly offset from one another along a periphery of the block.

As the polygon mirror 60 rotates, the scanner 11 produces one scan line for each reflective surface of the polygon mirror 60, and the planar mirror 20 pivots to distribute the scan lines across the FOR. Thus, if the scan lines are directed horizontally, the polygon mirror 60 is responsible primarily for the horizontal dimension of the field of regard, and the planar mirror 14 accordingly is responsible for vertical dimension of the field of regard.

Adjacent reflective surfaces 64-70 of the block are preferably joined to one another along a drag-reducing, non-sharp edge to promote aerodynamic efficiency and reduce audible noise. As an example, the block may include rounded or chamfered edges or corners. As another example, the block may include edges with texturing, grooves, riblets, or a sawtooth pattern. It is appreciated that additional features of the polygon mirror 60 are described in U.S. patent application Ser. No. 15/958,749 filed on Apr. 20, 2018 and issued as U.S. Pat. No. 10,451,716 the entire contents are incorporated by reference herein.

The lidar sensor unit may be in the form of a low profile scanner head provided as a box-like protrusion on any number of positions on a vehicle (e.g., each corner of the roof of a vehicle, preferably at 45° relative to each of the edges). In some examples, the lidar scanner system may be partially embedded in the vehicle roof or other vehicle body part so only a window of the unit protrudes prominently from the roof (or hood, side mirror, rear-view mirror, windshield, bumper, grill, or other body part surface in which the lidar scanner head is disposed). In some implementations, the scanner 11 may include one or more non-moving stationary mirrors located between the planar mirror 20 and the polygon mirror 60. For example, a stationary mirror may be used to turn or steer the output beam 104 or input beam 106 and may allow the lidar system 1 to have a reduced overall height, width, or length.

The planar mirror 20 may be configured so as to pivot over a range of allowable motion larger than a range corresponding to the vertical angular dimension of the field of regard, so as to define a maximum range of allowable motion larger than a range within which the planar mirror 20 pivots during a scan. In some examples, a controller associated with the planar mirror 20 may select different portions of the maximum range of allowable motion as the range within which the mirror pivots, in accordance with modifications of the scan pattern. In particular, to modify at least one of a scan pattern or a scan rate, a controller associated with a motor of the polygon mirror 60 can be configured to cause the motor to vary the speed of rotation of the polygon mirror 60, cause the actuator assembly 30 to vary the vary the oscillation of the planar mirror 20, or both. The controller can be associated with both mirrors 20, 60. The controller may be configured to modify the scan pattern on a frame-by-frame basis, each frame corresponding to a complete scan of the field of regard of the lidar sensor unit. In some implementations, the oscillation of the planar mirror 20 may be varied (e.g., to change the vertical angular dimension of the field of regard), and the rotational speed of the polygon mirror 60 may be regulated or stabilized so that the polygon mirror 60 rotates at a substantially constant speed.

FIG. 10 illustrates an example lidar system 1 in which all or some of the components of the lidar sensor unit and the scanner 11 can be implemented according to a single-eye configuration. The lidar system 1 may be referred to as a laser ranging system, a laser radar system, a LIDAR system, a lidar sensor, or a laser detection and ranging (LADAR or ladar) system. The lidar system 1 may include a light source 76, a mirror 78 (referred to as overlap mirror, superposition mirror, or beam-combiner mirror), the above-described scanner 11, a receiver 80, and a controller 82 equipped with a memory unit 85. In some implementations, the lidar system 1 also can include one or more sensors 86 such as a temperature sensor, a moisture sensor, etc.

Depending on the implementation, the controller 82 may include one or more processors, an application-specific integrated circuit (ASIC), a field-programmable gate array (FPGA), and/or other suitable circuitry. The non-transitory computer-readable memory 85 of the controller 82 can be configured to store instructions executable by the controller 82 as well as data which the controller 82 can produce based on the signals from the components of the system 1 and/or provide to these components. The memory 85 can include volatile (e.g., RAM) and/or non-volatile (e.g., flash memory, a hard disk) components. The data the controller 82 generates during operation and stores in the memory 85 can include pixel data and other results of analyzing characteristics of the target 120, alarm data (e.g., readings from the sensors 86 that exceed certain predefined thresholds), and the configuration data the controller 82 can retrieve from the memory 85 during operation can include definitions of various scan patterns, for example. Alternatively or additionally to the memory 85, the controller 82 can be configured to access memory disposed remotely relative to the lidar system 1 in the vehicle controller (see below) or even memory disposed remotely relative to the vehicle, such as on a network server. In addition to collecting data from receiver 80, the controller 82 can provide control signals to and, in some implementations, receive diagnostics data from, the light source 76, the one or more sensors 86, and the scanner 11 via communication links 88.

In some implementations, the light source 76 can be in the form of an output collimator having a lens rigidly coupled to an end of a fiber-optic cable, with the other end of the fiber-optic cable coupled to a laser disposed remotely relative to the scanner 11. In other implementations, the light source 76 can be an assembly that includes a laser. The light source 76 thus may include, or be optically coupled to, a laser which emits light having a particular operating wavelength in the infrared, visible, or ultraviolet portions of the electromagnetic spectrum. As a more specific example, the light source 76 may include a laser with an operating wavelength between approximately 1.2 µm and 1.7 µm.

In operation, the light source 76 emits an output beam of light 104 which may be continuous-wave, pulsed, or modulated in any suitable manner for a given application. The output beam of light 104 is directed downrange toward a remote target 120 located a distance D from the lidar system 1 and at least partially contained within a field of regard of the system 1. Depending on the scenario and/or the implementation of the lidar system 1, the distance D can be between 1 m and 1 km, for example.

Once the output beam 104 reaches the downrange target 120, the target 120 may scatter or, in some cases, reflect at least a portion of light from the output beam 104, and some of the scattered or reflected light may return toward the lidar system 1. In the example of FIG. 10, the scattered or reflected light is represented by input beam 106, which passes through the scanner 11. The input beam 106 passes through the scanner 11 to the mirror 78. The mirror 78 in turn directs the input beam 106 to the receiver 80. The input beam 106 may contain only a relatively small fraction of the light from the output beam 104. For example, the ratio of average power, peak power, or pulse energy of the input beam 106 to average power, peak power, or pulse energy of the output beam 104 may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of the output beam 104 has a pulse energy of 1 microjoule (µJ), then the pulse energy of a corresponding pulse of the input beam 106 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, or 1 aJ.

The output beam 104 may be referred to as a laser beam, light beam, optical beam, emitted beam, or just beam; and the input beam 106 may be referred to as a return beam, received beam, return light, received light, input light, scattered light, or reflected light. As used herein, scattered light may refer to light that is scattered or reflected by the target 120. The input beam 106 may include light from the output beam 104 that is scattered by the target 120, light from the output beam 104 that is reflected by the target 120, or a combination of scattered and reflected light from target 120. The input beam 106 also can include "passive" light signals, or light from various other sources and of various wavelengths scattered by the target 120.

The operating wavelength of a lidar system 1 may lie, for example, in the infrared, visible, or ultraviolet portions of the electromagnetic spectrum. The Sun also produces light in these wavelength ranges, and thus sunlight can act as background noise which can obscure signal light detected by the lidar system 1. This solar background noise can result in false-positive detections or can otherwise corrupt measurements of the lidar system 1, especially when the receiver 80 includes SPAD detectors (which can be highly sensitive).

In some implementations, the light source 76, the scanner 11, and the receiver 80 are packaged together within a single housing 100, which may be a box, case, or enclosure that holds or contains all or part of a lidar system 1. In the example of FIG. 10, the housing 100 includes a window 102 through which the beams 104 and 106 pass. In one example implementation, the lidar-system housing 165 contains the light source 76, the overlap mirror 78, the scanner 11, and the receiver 80 of the lidar system 1. The controller 82 may reside within the same housing 100 as the components 76, 11, 80 or the controller 82 may reside remotely from the housing 100.

Moreover, in some implementations, the housing 100 includes multiple lidar sensor units, each including a respective scanner and a receiver. Depending on the particular implementation, each of the multiple lidar sensor units can include a separate light source or a common light source. The multiple lidar sensor units can be configured to cover non-overlapping adjacent fields of regard or partially overlapping fields of regard, depending on the implementation.

The housing 100 may be an airtight or watertight structure that prevents water vapor, liquid water, dirt, dust, or other contaminants from getting inside the housing 100. The housing 100 may be filled with a dry or inert gas, such as for example dry air, nitrogen, or argon. The housing 100 may include one or more electrical connections for conveying electrical power or electrical signals to and/or from the housing.

The window 102 may be made from any suitable substrate material, such as for example, glass or plastic (e.g., polycarbonate, acrylic, cyclic-olefin polymer, or cyclic-olefin copolymer). The window 102 may include an interior surface (surface A) and an exterior surface (surface B), and surface A or surface B may include a dielectric coating having particular reflectivity values at particular wavelengths. A dielectric coating (which may be referred to as a thin-film coating, interference coating, or coating) may include one or more thin-film layers of dielectric materials (e.g., $SiO_2$, $TiO_2$, $Al_2O_3$, $Ta_2O_5$, $MgF_2$, $LaF_3$, or $AlF_3$) having particular thicknesses (e.g., thickness less than 1 µm) and particular refractive indices. A dielectric coating may be deposited onto surface A or surface B of the window 102 using any suitable deposition technique, such as for example, sputtering or electron-beam deposition.

The dielectric coating may have a high reflectivity at a particular wavelength or a low reflectivity at a particular wavelength. A high-reflectivity (HR) dielectric coating may have any suitable reflectivity value (e.g., a reflectivity greater than or equal to 80%, 90%, 95%, or 99%) at any suitable wavelength or combination of wavelengths. A low-reflectivity dielectric coating (which may be referred to as an anti-reflection (AR) coating) may have any suitable reflectivity value (e.g., a reflectivity less than or equal to 5%, 2%, 1%, 0.5%, or 0.2%) at any suitable wavelength or combination of wavelengths. In particular embodiments, a dielectric coating may be a dichroic coating with a particular combination of high or low reflectivity values at particular wavelengths. For example, a dichroic coating may have a reflectivity of less than or equal to 0.5% at approximately 1550-1560 nm and a reflectivity of greater than or equal to 90% at approximately 800-1500 nm.

In some implementations, surface A or surface B has a dielectric coating that is anti-reflecting at an operating wavelength of one or more light sources 76 contained within housing 100. An AR coating on surface A and surface B may increase the amount of light at an operating wavelength of light source 76 that is transmitted through the window 102. Additionally, an AR coating at an operating wavelength of the light source may reduce the amount of incident light from output beam 104 that is reflected by the window 102 back into the housing 100. In an example implementation, each of surface A and surface B has an AR coating with reflectivity less than 0.5% at an operating wavelength of light source 76. As an example, if the light source 76 has an operating wavelength of approximately 1550 nm, then surface A and surface B may each have an AR coating with a reflectivity that is less than 0.5% from approximately 1547 nm to approximately 1553 nm. In another implementation, each of surface A and surface B has an AR coating with reflectivity less than 1% at the operating wavelengths of the light source. For example, if the housing 100 encloses two sensor heads with respective light sources, the first light source emits pulses at a wavelength of approximately 1535 nm and the second light source emits pulses at a wavelength of approximately 1540 nm, then surface A and surface B may each have an AR coating with reflectivity less than 1% from approximately 1530 nm to approximately 1545 nm.

The window 102 may have an optical transmission that is greater than any suitable value for one or more wavelengths of one or more light sources 76 contained within the housing 165. As an example, the window 102 may have an optical transmission of greater than or equal to 70%, 80%, 90%, 95%, or 99% at a wavelength of light source 76. In one example implementation, the window 102 can transmit greater than or equal to 95% of light at an operating wavelength of the light source 76. In another implementation, the window 102 transmits greater than or equal to 90% of light at the operating wavelengths of the light sources enclosed within the housing 100.

Surface A or surface B may have a dichroic coating that is anti-reflecting at one or more operating wavelengths of one or more light sources 76 and high-reflecting at wavelengths away from the one or more operating wavelengths. For example, surface A may have an AR coating for an operating wavelength of the light source 76, and surface B may have a dichroic coating that is AR at the light-source operating wavelength and HR for wavelengths away from the operating wavelength. A coating that is HR for wavelengths away from a light-source operating wavelength may prevent most incoming light at unwanted wavelengths from being transmitted through the window 102. In one implementation, if light source 76 emits optical pulses with a wavelength of approximately 1550 nm, then surface A may have an AR coating with a reflectivity of less than or equal to 0.5% from approximately 1546 nm to approximately 1554 nm. Additionally, surface B may have a dichroic coating that is AR at approximately 1546-1554 nm and HR (e.g., reflectivity of greater than or equal to 90%) at approximately 800-1530 nm and approximately 1570-1700 nm.

Surface B of the window 102 may include a coating that is oleophobic, hydrophobic, or hydrophilic. A coating that is oleophobic (or, lipophobic) may repel oils (e.g., fingerprint oil or other non-polar material) from the exterior surface (surface B) of the window 102. A coating that is hydrophobic may repel water from the exterior surface. For example, surface B may be coated with a material that is both oleophobic and hydrophobic. A coating that is hydrophilic attracts water so that water may tend to wet and form a film on the hydrophilic surface (rather than forming beads of water as may occur on a hydrophobic surface). If surface B has a hydrophilic coating, then water (e.g., from rain) that lands on surface B may form a film on the surface. The surface film of water may result in less distortion, deflection, or occlusion of an output beam 104 than a surface with a non-hydrophilic coating or a hydrophobic coating.

With continued reference to FIG. 10, the light source 76 may include a pulsed laser configured to produce or emit pulses of light with a certain pulse duration. In an example implementation, the pulse duration or pulse width of the pulsed laser is approximately 10 picoseconds (ps) to 20 nanoseconds (ns). In another implementation, the light source 76 is a pulsed laser that produces pulses with a pulse duration of approximately 1-4 ns. In yet another implementation, the light source 76 is a pulsed laser that produces pulses at a pulse repetition frequency of approximately 100 kHz to 5 MHz or a pulse period (e.g., a time between consecutive pulses) of approximately 200 ns to 10 µs. The light source 76 may have a substantially constant or a variable pulse repetition frequency, depending on the implementation. As an example, the light source 76 may be a pulsed laser that produces pulses at a substantially constant pulse repetition frequency of approximately 640 kHz (e.g., 640,000 pulses per second), corresponding to a pulse period of approximately 1.56 µs. As another example, the light source 76 may have a pulse repetition frequency that can be varied from approximately 500 kHz to 3 MHz. As used herein, a pulse of light may be referred to as an optical pulse, a light pulse, or a pulse, and a pulse repetition frequency may be referred to as a pulse rate.

In general, the output beam 104 may have any suitable average optical power, and the output beam 104 may include optical pulses with any suitable pulse energy or peak optical power. Some examples of the average power of the output beam 104 include the approximate values of 1 mW, 10 mW, 100 mW, 1 W, and 10 W. Example values of pulse energy of the output beam 104 include the approximate values of 0.1 µJ, 1 µJ, 10 µJ, 100 µJ, and 1 mJ. Examples of peak power values of pulses included in the output beam 104 are the approximate values of 10 W, 100 W, 1 kW, 5 kW, 10 kW. An example optical pulse with a duration of 1 ns and a pulse energy of 1 µJ has a peak power of approximately 1 kW. If the pulse repetition frequency is 500 kHz, then the average power of the output beam 104 with 1-µJ pulses is approximately 0.5 W, in this example.

The light source 76 may include a laser diode, such as a Fabry-Perot laser diode, a quantum well laser, a distributed Bragg reflector (DBR) laser, a distributed feedback (DFB) laser, or a vertical-cavity surface-emitting laser (VCSEL). The laser diode operating in the light source 76 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable diode. In some implementations, the light source 76 includes a pulsed laser diode with a peak emission wavelength of approximately 1400-1600 nm. Further, the light source 76 may include a laser diode that is current-modulated to produce optical pulses.

In some implementations, the light source 76 includes a pulsed laser diode followed by one or more optical-amplification stages. For example, the light source 76 may be a fiber-laser module that includes a current-modulated laser diode with a peak wavelength of approximately 1550 nm, followed by a single-stage or a multi-stage erbium-doped fiber amplifier (EDFA) or erbium/ytterbium-doped fiber amplifier (EYDFA). As another example, the light source 76 may include a continuous-wave (CW) or quasi-CW laser diode followed by an external optical modulator (e.g., an electro-optic modulator), and the output of the modulator may be fed into an optical amplifier. In yet other implementations, the light source 76 may include a pulsed solid-state laser or a pulsed fiber laser.

The receiver 80 may be referred to as (or may include) a photoreceiver, optical receiver, optical sensor, detector, photodetector, or optical detector. The receiver 80 in some implementations receives or detects at least a portion of the input beam 106 and produces an electrical signal that corresponds to the input beam 106. For example, if the input beam 106 includes an optical pulse, then the receiver 80 may produce an electrical current or voltage pulse that corresponds to the optical pulse detected by the receiver 80. In an example implementation, the receiver 80 includes one or more avalanche photodiodes (APDs) or one or more single-photon avalanche diodes (SPADs). In another implementation, the receiver 80 includes one or more PN photodiodes (e.g., a photodiode structure formed by a p-type semiconductor and an n-type semiconductor) or one or more PIN photodiodes (e.g., a photodiode structure formed by an undoped intrinsic semiconductor region located between p-type and n-type regions).

The receiver 80 may have an active region or an avalanche-multiplication region that includes silicon, germanium, or InGaAs. The active region of receiver 80 may have any suitable size, such as for example, a diameter or width of approximately 50-500 µm. The receiver 80 may include circuitry that performs signal amplification, sampling, filtering, signal conditioning, analog-to-digital conversion, time-to-digital conversion, pulse detection, threshold detection, rising-edge detection, or falling-edge detection. For example, the receiver 80 may include a transimpedance amplifier that converts a received photocurrent (e.g., a current produced by an APD in response to a received optical signal) into a voltage signal. The receiver 80 may direct the voltage signal to pulse-detection circuitry that produces an analog or digital output signal that corresponds to one or more characteristics (e.g., rising edge, falling edge, amplitude, or duration) of a received optical pulse. For example, the pulse-detection circuitry may perform a time-to-digital conversion to produce the digital output signal. The receiver 80 may send the electrical output signal to the controller 82 for processing or analysis, e.g., to determine a time-of-flight value corresponding to a received optical pulse.

The controller 82 may be electrically coupled or otherwise communicatively coupled to one or more of the light source 76, the scanner 11, and the receiver 80. The controller 82 may receive electrical trigger pulses or edges from the light source 76, where each pulse or edge corresponds to the emission of an optical pulse by the light source 76. The controller 82 may provide instructions, a control signal, or a trigger signal to the light source 76 indicating when the light source 76 should produce optical pulses. For example, the controller 82 may send an electrical trigger signal that includes electrical pulses, where the light source 76 emits an optical pulse in response to each electrical pulse. Further, the controller 82 may cause the light source 76 to adjust one or more of the frequency, period, duration, pulse energy, peak power, average power, or wavelength of the optical pulses produced by the light source 76.

The controller 82 may determine a time-of-flight value for an optical pulse based on timing information associated with when the pulse was emitted by the light source 76 and when a portion of the pulse (e.g., the input beam 106) was detected or received by the receiver 80. The controller 82 may include circuitry that performs signal amplification, sampling, filtering, signal conditioning, analog-to-digital conversion, time-to-digital conversion, pulse detection, threshold detection, rising-edge detection, or falling-edge detection.

As indicated above, the lidar system 1 may be used to determine the distance to one or more downrange targets 120. By scanning the output beam 104 across a field of regard, the lidar system 1 can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. For example, a depth map may cover a field of regard that extends 60° horizontally and 15° vertically, and the depth map may include a frame of 100-2000 pixels in the horizontal direction by 4-400 pixels in the vertical direction.

In some examples (not illustrated) a lidar system 1 may be provided that uses two eyes to scan a combined FOR rather than a single eye. Such a scanner 11 in this configuration may use two different reflective surfaces of the polygon mirror 12 to direct two output beams toward the target and concurrently receive and process two input beams.

The components of the lidar system 1 may be configured so that at least a portion of the planar mirror 20 extends above the rotatable polygon mirror 60, and only a region extending from a lower edge of the planar mirror 20 to a top of the housing projects prominently from a surface of a body of a vehicle on which the lidar system 1 is deployed.

Referring to FIG. 11, the housing 100 may be embedded in the roof of a vehicle 130, with the window 102 oriented similar to the windshield of the vehicle 130. The housing 100 encloses the lidar system 1, oriented so that the axis of rotation A1 of the polygon mirror 60 is aligned with a longitudinal axis of the vehicle 132. This orientation may serve to reduce adverse effects of vibration, acceleration, and deceleration. Thus, when the vehicle 130 accelerates quickly, the polygon mirror enclosed in the housing 100 may be displaced along the axis A1, and the input and output beams impinge on the surface of the polygon mirror on the same plane as in the configuration prior to the displacement, which does not result in the scan lines being misaligned to displaced (i.e., the beams may strike different portions of the reflective surface, but the reflection imparted by these portions of the reflective surface is the same as in the original configuration). Similarly, when the vehicle 130 decelerates quickly, the potential displacement of the polygon mirror along the axis A1 does not adversely affect the scan lines. In contrast to these scenarios, when axis A1 is perpendicular to the orientation of the vehicle 130, the displacement of the polygon mirror may result in the horizontal FOR shifting right or left, which in turn results in scan errors.

In general, any suitable number of lidar sensor units may be integrated into a vehicle. In one example implementation, multiple lidar sensor units may be integrated into a car to provide a complete 360-degree horizontal FOR around the car. As another example, 4-10 lidar sensor units, each system having a 45-degree to 90-degree horizontal FOR, may be combined together to form a sensing system that provides a point cloud covering a 360-degree horizontal FOR. The lidar sensor units may be oriented so that adjacent FORs have an amount of spatial or angular overlap to allow data from the multiple lidar sensor units to be combined or stitched together to form a single or continuous 360-degree point cloud. As an example, the FOR of each lidar system may have approximately 1-15 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

In some implementations, one or more lidar sensor units are included in a vehicle as part of an advanced driver assistance system (ADAS) to assist a driver of the vehicle in the driving process. For example, a lidar sensor unit may be part of an ADAS that provides information or feedback to a driver (e.g., to alert the driver to potential problems or hazards) or that automatically takes control of part of a vehicle (e.g., a braking system or a steering system) to avoid collisions or accidents. The lidar sensor unit may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In some cases, one or more lidar sensor units are integrated into a vehicle as part of an autonomous-vehicle driving system. In an example implementation, the lidar sensor units provide information about the surrounding environment to a driving system of an autonomous vehicle. An autonomous-vehicle driving system may include one or more computing systems that receive information from the lidar sensor units about the surrounding environment, analyze the received information, and provide control signals to the vehicle's driving systems (e.g., steering wheel, accelerator, brake, or turn signal). For example, the lidar sensor units integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 120 and their respective locations, distances, or speeds, and the autonomous-vehicle driving system may update control signals based on this information. As an example, if the lidar system 1 detects a vehicle ahead that is slowing down or stopping, the autonomous-vehicle driving system may send instructions to release the accelerator and apply the brakes.

An autonomous vehicle may be referred to as an autonomous car, driverless car, self-driving car, robotic car, or unmanned vehicle. An autonomous vehicle may be a vehicle configured to sense its environment and navigate or drive with little or no human input. For example, an autonomous vehicle may be configured to drive to any suitable location and control or perform all safety-critical functions (e.g., driving, steering, braking, and parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

An autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As indicated above, a light source of the lidar system 1 can be located remotely from some of the other components of the lidar system 1 (such as the scanner 11 and the receiver 80. Moreover, a lidar system implemented in a vehicle may include fewer light sources than scanners and receivers.

In one implementation, the controller 82 generates and dynamically modifies the drive signal for the actuator system 30 which oscillates the planar mirror 20. The motor driving rotation of the polygon mirror 60 may operate in an open-loop mode, without relying on control signals from the controller 82. In this implementation, the motor driving the polygon mirror 60 may rotate at a constant speed to generate similar scan lines, while variations in the speed at which the planar mirror 20 moves relative to the axis of oscillation can result in some scan lines being farther apart, some scan lines being closer together, etc. Further, the controller 82 can modify the drive signal for the actuator system 30 to reposition the entire operational FOR of the lidar system 1 within the larger range motion available to the planar mirror 20. Still further, the controller 82 can modify the drive signal for the actuator system 30 to "stretch" the FOR of the operational FOR of the lidar system 1 so as to encompass the entire available FOR. In some implementations, the motor driving rotation of the polygon mirror 60 may operate in a closed-loop mode, where the motor receives a control signal that regulates, stabilizes, or adjusts the rotational speed of the polygon mirror 60. For example, the polygon mirror 60 may be provided with a tab that passes through one or more stationary photo-interrupters as the polygon mirror 60 rotates. The signals from the photo-interrupters may be sent to the controller 82, and the controller 82 may provide a control signal to the motor to maintain the rotation speed of the polygon mirror 60 at a substantially constant value.

In other implementations, however, the controller 82 modifies the drive signal supplied to the motor to thereby adjust the rotation of the polygon mirror 60. For example, the controller 82 may slow down the rotation of the polygon mirror 60 when the output beam (or a pair of output beams associated with the same eye) traverses the middle of the scan line, so that pixel density near the center of the horizontal FOR is higher than at the periphery of the horizontal FOR.

The controller may modify the drive signal for the motor and/or the drive signal for the actuator system 30 dynamically in response to various triggering events. In addition to detection of an upward or downward slope, examples of suitable triggering events include detection of a particular object in a certain direction relative to the vehicle (e.g., if an object is moving quickly across the path of the vehicle, the lidar system 1 may modify the scan pattern to obtain a higher density rate where the object is detected to be able to better respond to the potential threat of collision), a sound detected at in a certain direction relative to the vehicle, a heat signature detected at in a certain direction relative to the vehicle, etc.

Figure 13:
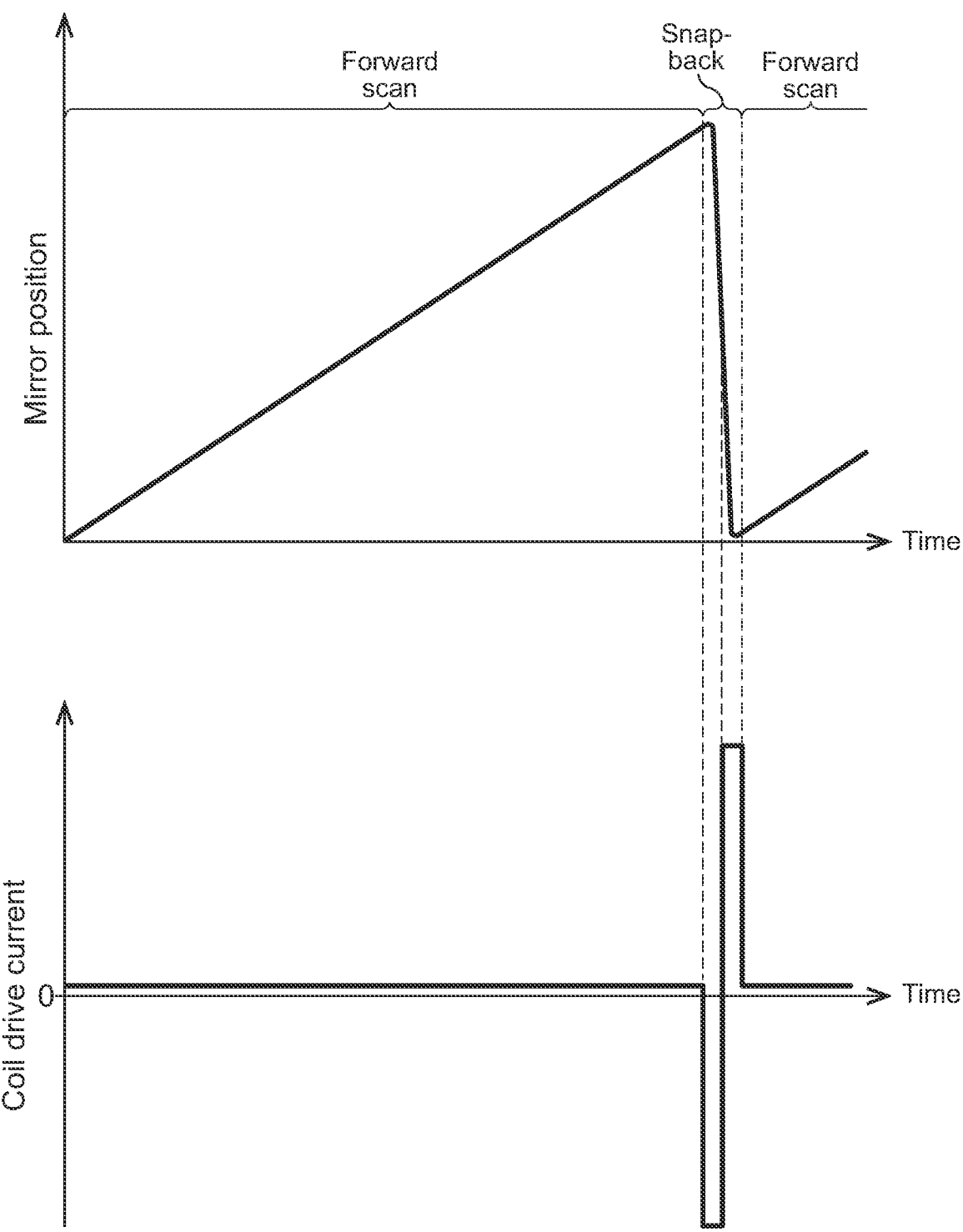
FIG. 13 illustrates graphs depicting example mirror position and coil drive current of the scanner of FIGS. 1-12b over time in accordance with various embodiments.

FIG. 13 includes a graph of mirror position versus time and a corresponding graph of coil drive current versus time. The graph depicting mirror position may represent the angular position of the mirror 20, and one forward scan corresponds to one scan across the FOR. The snap-back represents the relatively rapid reverse scan of the mirror 20 back to a starting position where it then begins a new forward scan.

The forward scan may cause the mirror 20 to rotate at a particular rotation rate. For example, one forward scan of the mirror may correspond to an approximately 15-degree rotation of the mirror over a time interval of approximately 100 ms, which corresponds to a rotation rate of approximately 2.6 rad/s. The forward scan rate may be approximately constant (e.g., approximately 2.6 rad/s), or the forward scan rate may be varied (e.g., between approximately 1 rad/s and approximately 4 rad/s) to adjust the density of scan lines. For example, the forward scan rate may be slower near the middle of the FOR so that more scan lines are located in that region and fewer scan lines are directed at the ground or sky. The snap-back may include a relatively rapid deceleration of the mirror 20 followed by a relatively rapid movement of the mirror 20 back to the forward-scan starting position. For example, one forward scan may have a duration of approximately 20-200 ms, and a snap-back may have a duration of approximately 0.5-10 ms.

In some implementations, a scanner 11 may include an electronic driver that provides a drive current to the coil member of the coil assembly. The coil drive current may include (i) a low-amplitude current and (ii) a high-amplitude square-wave current signal. The low-amplitude current may cause the mirror 20 to pivot about the mirror axle in a forward-scan direction. The high-amplitude square-wave current signal may include a negative-current pulse followed by a positive-current pulse, which causes the mirror to execute a snap-back motion. The negative-current pulse may have a polarity or direction that is opposite the low-amplitude current, and the positive-current pulse may have the same polarity as the low-amplitude current. In the snap-back motion, the mirror 20 rapidly slows down, moves in the opposite direction (relative to the forward-scan direction), and then rapidly slows down again to begin a new forward scan. The negative-current pulse causes the rotation rate of the mirror to slow and then reverse direction (in the direction opposite the forward-scan direction), and the positive-current pulse causes the rotation rate of the mirror to slow and then begin moving in the forward-scan direction. The low-amplitude current may be a substantially constant current that causes the mirror 20 to pivot at a particular rotation rate (e.g., approximately 1 rad/s, approximately 2 rad/s, approximately 5 rad/s, or approximately 10 rad/s). Alternatively, the low-amplitude current may vary so that the rotation speed of the mirror 20 varies similarly while scanning the FOR. The relatively high-amplitude current pulses of the square-wave current signal may have each have an amplitude that is more than approximately 5 times, approximately 10 times, approximately 100 times, or approximately 1,000 times larger than the relatively low-amplitude current.

So configured, the scanner is highly efficient, and therefore eliminates the need for exotic materials such as beryllium or silicon carbide. The actuator assembly distributes force evenly along the mirror, and as such, materials like aluminum can be used for the mirror. The actuator assembly itself is contained within the footprint of the mirror, and as a result, the overall package size of the second mirror assembly is significantly reduced as compared to current systems.

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A scanner for a lidar system, the scanner configured to direct emitted light to scan a field of regard of the lidar system in accordance with a scan pattern, the scanner comprising:
    a mirror including a reflective surface and a rear surface and being pivotable along a mirror axle;
    a coil member arranged in an elongated at least partially-cylindrical surface, wherein the elongated at least partially-cylindrical surface has a longitudinal axis coinciding with a rotation axis of the mirror axle and wherein the coil member is mounted via slots in the rear surface of the mirror; and
    an actuator assembly disposed along the rear surface of the mirror, the actuator assembly configured to exert a torque on the mirror to cause the mirror to pivot about the mirror axle.

2. The scanner of claim 1, wherein the actuator assembly comprises:
    an inner assembly body having a first surface and a second surface, the first surface of the inner assembly body being positioned adjacent to the rear surface of the mirror and extending along a length thereof;
    a coil assembly having a first surface and a second surface, the first surface of the coil assembly being positioned adjacent to the second surface of the inner assembly body; and
    an outer assembly body having a first surface and a second surface, the first surface of the outer assembly body being positioned adjacent to the second surface of the coil assembly.

3. The scanner of claim 2, wherein the coil assembly comprises the coil member encapsulated in a polymeric material.

4. The scanner of claim 2, wherein the coil assembly comprises the coil member that forms a racetrack shape.

5. The scanner of claim 2, wherein the coil assembly comprises a printed circuit board (PCB) comprising a circuit trace forming a racetrack shape.

6. The scanner of claim 2, wherein the coil assembly comprises an electrically conductive material having a first coefficient of thermal expansion (CTE) and the mirror comprises a material having a second CTE, wherein the first CTE is approximately equal to the second CTE.

7. The scanner of claim 2, wherein the coil assembly further includes a first edge and a second edge opposite the first edge, wherein the rear surface of the mirror includes a first elongated slot to receive the first edge of the coil assembly and a second elongated slot to receive the second edge of the coil assembly.

8. The scanner of claim 2, further comprising at least one magnet positioned adjacent to or near the second surface of the outer assembly body, the at least one magnet configured to provide a magnetic field to the coil assembly.

9. The scanner of claim 2, wherein the second surface of the inner assembly body forms a cavity to accommodate a coil cross over portion of the coil assembly.

10. The scanner of claim 2, further comprising:
an electronic driver configured to provide a drive current to the coil assembly, the drive current comprising:
a low-amplitude current configured to cause the mirror to pivot about the mirror axle in a forward-scan direction, and
a high-amplitude square-wave current signal configured to rapidly slow a rate of rotation of the mirror and to cause the mirror to pivot about the mirror axle in a direction opposite the forward-scan direction.

11. The scanner of claim 1, further comprising at least one mounting cap adapted to couple with and mount the scanner within the lidar system.

12. The scanner of claim 1, further comprising:
a rotatable polygon mirror including a block having a first wall, a second wall, and a plurality of reflective surfaces extending between the first and second walls, the reflective surfaces being angularly offset from one another along a periphery of the block; and
a polygon mirror axle extending into the block through at least one of the first and second walls, about which the block rotates, the polygon mirror axle being orthogonal to the mirror axle.

13. The scanner of claim 12, wherein:
the polygon mirror is configured to rotate and produce one scan line of the scan pattern for each reflective surface of the polygon mirror; and
the mirror is configured to pivot and distribute the scan lines across the field of regard.

14. The scanner of claim 13, wherein:
the scan lines are directed horizontally; and
a scan rate of the mirror is slower near a middle of the field of regard so that more scan lines are located in the middle of the field of regard and fewer scan lines are directed at upper and lower portions of the field of regard.

15. A lidar system comprising:
a light source configured to emit light;
a scanner configured to direct the emitted light to scan a field of regard of the lidar system in accordance with a scan pattern, the scanner including:
a mirror having a reflective surface and a rear surface and being pivotable along a mirror axle,
a coil member arranged in an elongated at least partially-cylindrical surface, wherein the elongated at least partially-cylindrical surface has a longitudinal axis coinciding with a rotation axis of the mirror axle and wherein the coil member is mounted via slots in the rear surface of the mirror, and
an actuator assembly disposed along the rear surface of the mirror, the actuator assembly configured to exert a torque on the mirror to cause the mirror to pivot about the mirror axle;
a receiver configured to detect at least a portion of the emitted light scattered by one or more remote targets; and
a controller configured to control motion of at least the mirror to scan the emitted light along the scan pattern.

16. The lidar system of claim 15, wherein the scanner further includes:
a rotatable polygon mirror having a block having a first wall, a second wall, and a plurality of reflective surfaces extending between the first and second walls, the reflective surfaces being angularly offset from one another along a periphery of the block,
a polygon mirror axle extending into the block through at least one of the first and second walls, about which the block rotates, the polygon mirror axle being orthogonal to the mirror axle.

17. The lidar system of claim 15, wherein the actuator assembly comprises:
an inner assembly body having a first surface and a second surface, the first surface of the inner assembly body being positioned adjacent to the rear surface of the mirror and extending along a length thereof;
a coil assembly having a first surface and a second surface, the first surface of the coil assembly being positioned adjacent to the second surface of the inner assembly body; and
an outer assembly body having a first surface and a second surface, the first surface of the outer assembly body being positioned adjacent to the second surface of the coil assembly.

18. The lidar system of claim 17, wherein the coil assembly comprises the coil member encapsulated in a polymeric material.

19. The lidar system of claim 17, wherein the coil assembly comprises the coil member that forms a racetrack shape.

20. The lidar system of claim 17, wherein the coil assembly further includes a first edge and a second edge opposite the first edge, wherein the rear surface of the mirror includes a first elongated slot to receive the first edge of the coil assembly and a second elongated slot to receive the second edge of the coil assembly.

21. The lidar system of claim 17, further comprising at least one magnet positioned adjacent to or near the second surface of the outer assembly body, the at least one magnet configured to provide a magnetic field to the coil assembly.

22. The lidar system of claim 17, wherein the second surface of the inner assembly body forms a cavity to accommodate a coil cross over portion of the coil assembly.

23. The lidar system of claim 15, further comprising at least one mounting cap adapted to couple with and mount the scanner within the lidar system.

24. The lidar system of claim 15, further comprising a housing at least partially enclosing one or more of the light source, the scanner, the receiver, and the controller.

25. The lidar system of claim 15, wherein the lidar system is integrated into a vehicle, wherein the lidar system is partially embedded into a surface of the vehicle, wherein a window of the lidar system protrudes from the surface.

* * * * *